US006677511B2

(12) United States Patent
Genssler

(10) Patent No.: US 6,677,511 B2
(45) Date of Patent: Jan. 13, 2004

(54) STRING FOR MUSICAL INSTRUMENT

(75) Inventor: Gerold Genssler, Berlin (DE)

(73) Assignee: Velvet Strings SA, Mendrisio (CH)

(*) Notice: Subject to any disclaimer, the term of this patent is extended or adjusted under 35 U.S.C. 154(b) by 0 days.

(21) Appl. No.: 09/854,178

(22) Filed: May 11, 2001

(65) Prior Publication Data

US 2002/0002893 A1 Jan. 10, 2002

(30) Foreign Application Priority Data

May 15, 2000 (AT) ............................................ 2000-836

(51) Int. Cl.$^7$ .................................................. G01D 3/00
(52) U.S. Cl. ...................... 84/297 S; 84/199; 84/297 R
(58) Field of Search ............................... 84/297 S, 199, 84/297 R

(56) References Cited

U.S. PATENT DOCUMENTS

| | | | | |
|---|---|---|---|---|
| 1,363,902 A | * 12/1920 | Muller | 84/297 R |
| 1,617,102 A | * 2/1927 | Cohn | 84/297 R |
| 1,619,563 A | * 3/1927 | Burdwise | 84/297 R |
| 2,260,756 A | * 10/1941 | Repass | 84/297 R |

FOREIGN PATENT DOCUMENTS

| | | |
|---|---|---|
| DE | 360306 | 10/1922 |
| DE | 259127 | 10/1926 |
| EP | 0120363 | 10/1984 |
| GB | 237342 | 7/1925 |
| GB | 2226910 | * 7/1990 |

* cited by examiner

*Primary Examiner*—Shih-Yung Hsieh
(74) *Attorney, Agent, or Firm*—Friedrich Kueffner

(57) ABSTRACT

A string for musical instrument has a sound-generating portion and at least one mounting portion connected to and extending the length of the sound-generating portion, wherein the mounting portion serves to connect the string to the musical instrument. The sound-generating portion and the mounting portion are of different materials.

12 Claims, 2 Drawing Sheets

STRING FOR MUSICAL INSTRUMENT

BACKGROUND OF THE INVENTION

1. Field of the Invention

The present invention relates to a string for a musical instrument.

2. Description of the Related Art

Strings for musical instruments usually have a continuous core of steel wire, steel rope, natural fiber (usually sheep or cow gut), synthetic material (monofilic or multifilic with many individual fibers), or a combination of these materials. The core is frequently surrounded by a web covering of one or more wires of metal or another material. At the end portions, the web covering of wire is usually replaced by a web covering of silk or textile material. However, the string may also consist only of the core itself, for example, of steel wire in the case of the high E string of the violin or the high strings in the case of the steel string guitar, or of gut in the case of the pure gut string of high E string of the violin.

When manufacturing and dimensioning strings or string cores, there are requirements of a contradictory nature. The first requirement concerns the tensile strength of the core which must be as high as possible, so that the core can bear the loads which occur when the string is mounted on the musical instrument and when playing on the musical instrument. In contrast, there is the requirement for a satisfactory sound of the string which is only produced if the core is under a high tension which frequently is at the border of the stress at break. Musicians frequently demand strings which sound very clearly and loudly and respond quickly. However, there are limits to the realization of these demands because of the danger of rupture of the string. This danger of rupture is especially high in the area of the tuning mechanism which includes the tuning pegs around which the strings are wound several times. Because of the relatively small radius of the tuning peg and the unavoidable friction at the nut, an increased load acts on the string, wherein the stress in the string core at the tuning peg may be twice that of the stress in the remaining string core. In strings for string instruments, there is today a strong tendency to stay away from the steel core and to use string cores of fibers of synthetic or mineral materials or combinations thereof which sound similar to natural gut. These materials have a significantly higher notch sensitivity than the traditional steel strings, so that the compromise in dimensioning the core becomes even more difficult, or constructions which sound very good may become impossible to realize because of the danger of rupture. Accordingly, for reducing the notch tension in the areas of the ends of the strings, these end areas are covered in the conventional manner by a web covering of textile or silk threads and, adjacent these areas covered with web covering of textile or silk threads, the metal portion of the string is covered by a web covering of metal wire. However, especially in modern strings with cores of synthetic and mineral fibers, this conventional protection of the core is insufficient.

In addition, EP 0 120 363 A2 discloses so-called end heads for fastening to the ends of the string. These end heads serve for securing the string to the fastening elements of the musical instrument. This document additionally shows conventional loop-shaped configurations of the end of the string. For this purpose, the end of the string including the core of the string is folded over in the shape of a loop and is twisted onto the string. Strings with end heads are also disclosed in GB-Patent 237,342.

SUMMARY OF THE INVENTION

It is an important object of the present invention to provide a string for a musical instrument which better meets the afore-mentioned contradictory requirements of such a string, and which particularly reduces the danger of rupture of the string in the end portion thereof.

In accordance with the present invention, at least at one end of the sound-generating portion of the string, a mounting portion is attached for extending the sound-generating portion of the string and for connecting the string to the musical instrument, wherein the sound-generating portion and the mounting portion are of different materials.

The string can be attached to the tuning mechanism or the string holder of the musical instrument by means of the mounting portion which is provided at one end or at both ends of the string. This mounting portion, which does not have any influence on the sound of the string, may be of a material which is compatible with the notch tension and may have practically any dimension. For example, the mounting portion may be of a steel wire, while the sound-generating portion has a core of synthetic material or a mineral fiber or a combination thereof. For fastening the mounting portion to the sound-generating portion, a hose piece of fabric may be provided, wherein the mounting portion as well as the sound-generating portion extend into the hose piece. This hose piece of fabric may be manufactured by bobbin lacing or by braiding and may have such a diameter that it automatically contracts when a tensile stress acts on the two connected portions, so that the two portions are secured against separation. The connection may additionally be secured by an adhesive.

In accordance with a preferred embodiment of the invention, the mounting portion itself is composed of a hose of fabric wherein the end of the sound-generating portion of the string extends into one side of the hose. This hose, in turn, may be constructed in such a way that it automatically is clamped against the inserted end of the sound-generating portion when a tensile stress occurs and/or the connection may be manufactured or secured by means of an adhesive.

In accordance with an advantageous feature, the rope-shaped or hose-shaped mounting portion is constructed so as to be flexible and to extend the sound-generating portion which is also flexible.

The end heads known in the prior art merely serve to fasten the string at the appropriate fastening elements of the musical instrument; however, they do not constitute an extension of the sound-generating portion in the free area of the string which extends between the fastening elements of the musical instrument.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING In the drawing.

DESCRIPTION OF THE PREFERRED EMBODIMENTS

Figure 1:
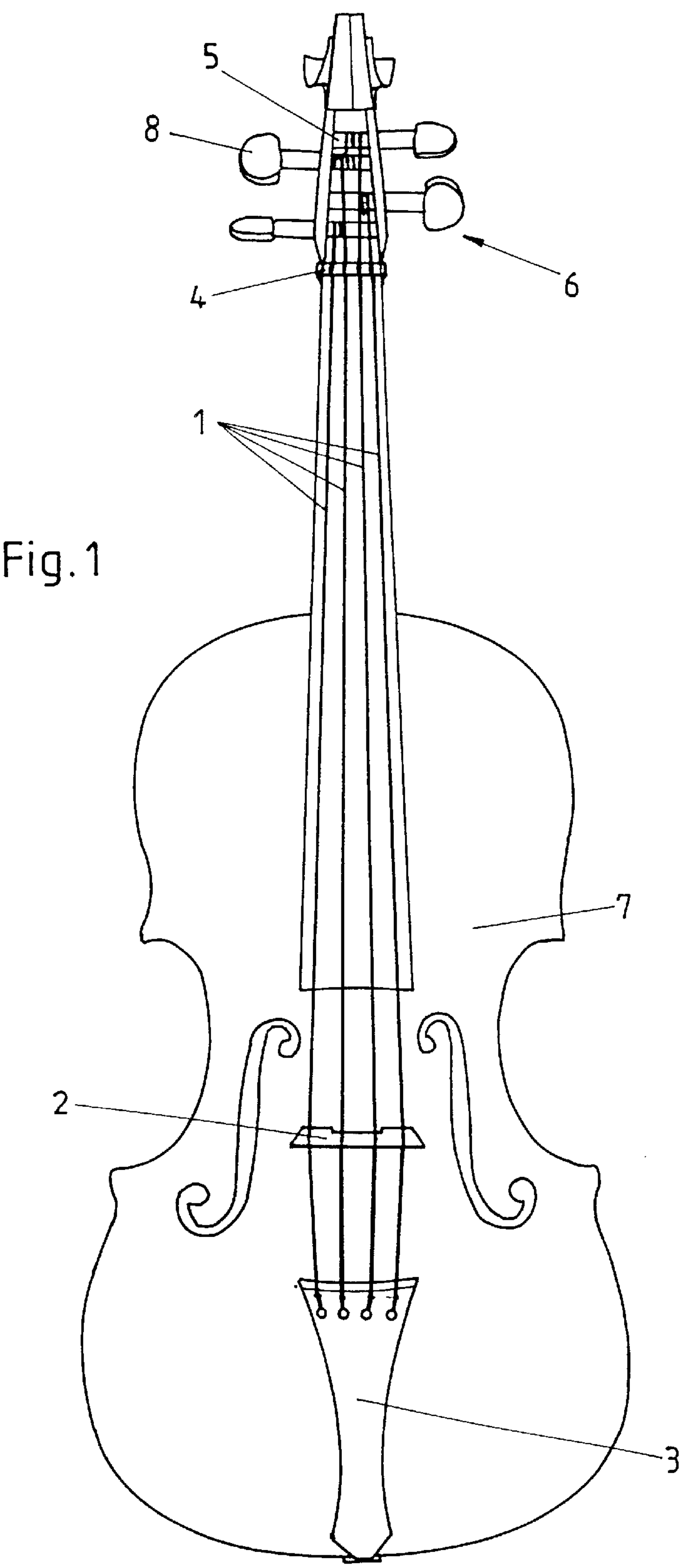
FIG. 1 is a schematic view of a string element in the form of a violin.

The string instrument illustrated in FIG. 1 includes a plurality of strings 1 mounted on a resonant body 7. The first ends of the strings 1 are attached to a string holder 3 and the second ends of the strings 1 are secured on tuning pegs 5 of a tuning mechanism 6. For this purpose, each tuning peg 5 may have a hole through which the end of the string 1 is inserted. The adjacent portion of the string is wound several times around the peg 5. The pegs 5 can be turned by means of actuating elements 8, so that the tension of the strings and, thus, the sound of the strings can be changed.

Figure 2:
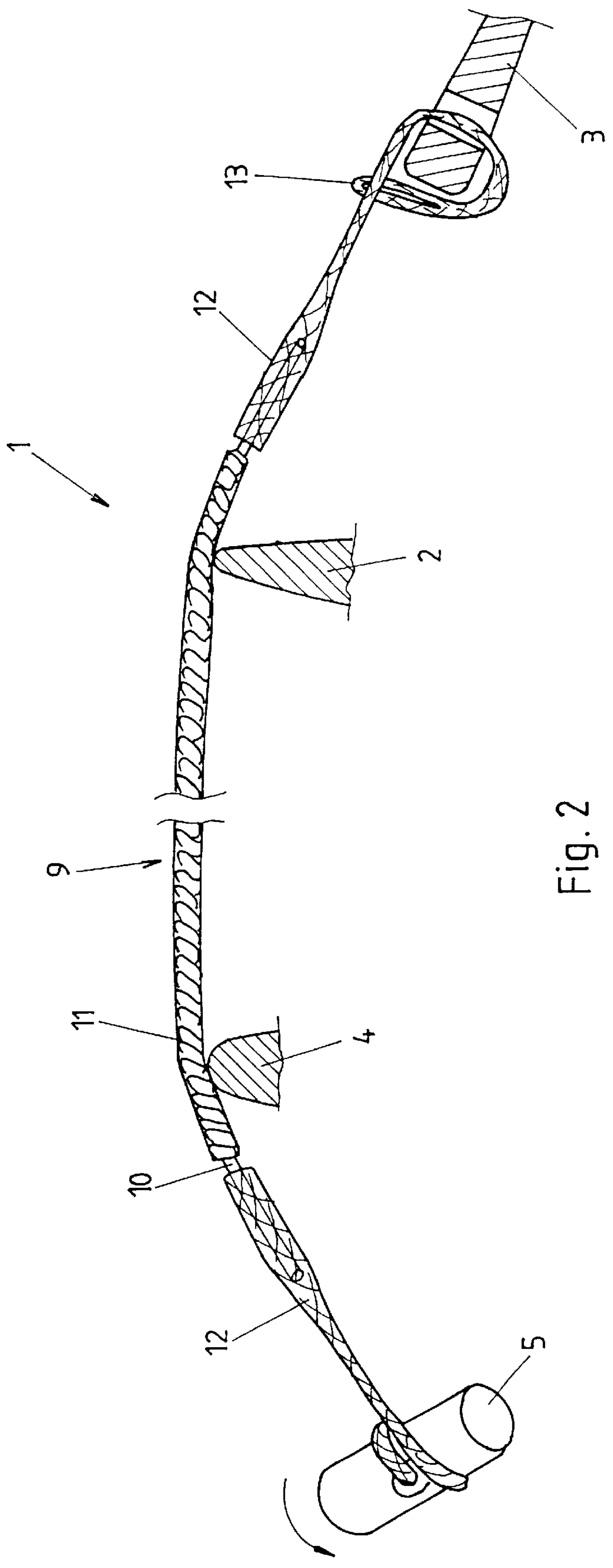
FIG. 2 is a schematic illustration of a string according to the present invention mounted on a string instrument.

The structure of an embodiment of a string according to the present invention is shown in detail in FIG. 2. FIG. 2 shows schematically in section the string holder 3, the bridge 2 and the nut 4, and a portion of the peg 5 is shown schematically in a perspective view and the string 1 is shown partially in section.

The string 1 includes a middle sound-generating portion 9 which extends in the area between the nut 4 and the bridge 2 and to some extent beyond the nut 4 toward the peg 5 and to some extent beyond the bridge 2 in the direction of the string holder 3. The sound-generating portion 9 of the string is formed by a core 10 which is surrounded by a web covering 11. These portions may be constructed in the same manner as conventional strings. For example, the core 10 may be of steel, a natural fiber (for example, sheep gut or cow gut), or of synthetic or mineral fibers. Metal wires are usually used for the web covering 11. The end portions of the core 10 are not covered by the web covering. A fabric hose is slid onto each end portion of the core 10 and forms a mounting portion of the string. The fabric hose is manufactured by bobbin lacing or braiding and has an internal diameter which corresponds to the diameter of the core 10, so that it is just possible to insert the end of the core 10 into the fabric hose. The angle of lacing of the fabric hose forming the mounting portion 12 is selected in such a way that the hose contracts or has the tendency to reduce its internal diameter when a tensile force is applied acting in the longitudinal direction. As a result, the core 10 is secured in the fabric hose forming the mounting portion 12 when the string 1 is mounted. In accordance with a preferred feature, the core 10 is additionally glued to the fabric hose forming the mounting portion 12; for example, an instantly bonding glue may be used for this purpose.

At the free end of the mounting portion 12 where the string 1 is connected to the string holder 3, the fabric hose is provided with a loop 13 which makes it possible to connect the string 1 in a simple manner to the string holder 3.

In accordance with another embodiment of the invention not shown in the drawing, the mounting portion 12 is composed of a piece of wire. There are various possibilities for connecting the wire piece to the sound-generating portion of the string 1, for example, through a piece of fabric hose into which the end of the sound-generating portion 9 and the end of the wire piece forming the mounting portion 12 are inserted, wherein these ends can be additionally glued to the piece of fabric hose. Other types of connections between the sound-generating portion and the mounting portion or portions are possible, for example, by soldering. It is also possible and conceivable to form the mounting portion of the wire of the web covering of the string core by extending this wire beyond the end of the wire core.

In addition to the increased strength of the ends of the string, the string according to the present invention has the additional advantage that the mounting portions do not require the string core of the sound-generating portion; this advantage is particularly significant in the case of very expensive string cores of, for example, sheep gut.

A fabric hose which is suitable for connecting the sound-generating portion of the string to the mounting portion 12 or which itself may form the mounting portion, may be, for example, of polyester or nylon.

While specific embodiments of the invention have been shown and described in detail to illustrate the inventive principles, it will be understood that the invention may be embodied otherwise without departing from such principles.

I claim:

1. A string for a musical instrument comprising a sound-generating portion and at least one mounting portion attached to an end of the sound-generating portion and extending the sound-generating portion and adapted to connect the string to the musical instrument, wherein the sound-generating portion and the mounting portion are of different materials, further comprising a piece of fabric hose for connecting the sound-generating portion and the mounting portion, wherein end portions of the sound-generating portion and the mounting portion extend into the hose piece.

2. The string according to claim 1, wherein the end portions of the sound-generating portion and of the mounting portion are glued to the hose piece.

3. A string for a musical instrument comprising a sound-generating portion and at least one mounting portion attached to an end of the sound-generating portion and extending the sound-generating portion and adapted to connect the string to the musical instrument, wherein the sound-generating portion and the mounting portion are of different materials, wherein the mounting portion is comprised of a hose of fabric, wherein an end portion of the sound-generating portion is inserted into the hose fabric.

4. The string according to claim 3, wherein the end portion of the sound-generating portion is glued to the hose of fabric.

5. The string according to claim 3, wherein the free end of the mounting portion is provided with a loop adapted for connection to a string holder of a musical instrument.

6. A string for a musical instrument comprising:

a sound-generating portion:

at least one flexible mounting portion attached to an end of the sound-generating portion and extending the sound-generating portion;

wherein, for connecting the string to the musical instrument, a portion of the string is in contact with fastening means of the musical instrument, wherein, in a mounted state of the string, the mounting portion extends over the portion of the string being in contact with the fastening means and further, extends over a portion of the string extending between the fastening means, and wherein the sound-generating portion and the mounting portion are of different materials, wherein the mounting portion is comprised of a wire connected to the sound-generating portion of the string.

7. A string for a musical instrument comprising:

a sound-generating portion:

at least one flexible mounting portion attached to an end of the sound-generating portion and extending the sound-generating portion;

wherein, for connecting the string to the musical instrument, a portion of the string is in contact with fastening means of the musical instrument, wherein, in a mounted state of the string, the mounting portion extends over the portion of the string being in contact with the fastening means and further, extends over a portion of the string extending between the fastening means, and wherein the sound-generating portion and the mounting portion are of different materials, wherein mounting portions are connected to both ends of the sound-generating portion.

8. The string according to claim 7, wherein the mounting portions are adapted to extend between the sound-generating portion and a tuning mechanism and between the sound-generating portion and a string holder of the musical instrument.

9. A string for a musical instrument comprising:

a sound-generating portion:

at least one flexible mounting portion attached to an end of the sound-generating portion and extending the sound-generating portion;

wherein, for connecting the string to the musical instrument, a portion of the string is in contact with fastening means of the musical instrument, wherein, in a mounted state of the string, the mounting portion extends over the portion of the string being in contact with the fastening means and further, extends over a portion of the string extending between the fastening means, and wherein the sound-generating portion and the mounting portion are of different materials, wherein the mounting portion is adapted to extend between the sound-generating portion and a tuning mechanism of the musical instrument.

10. A string for a musical instrument comprising:

a sound-generating portion:

at least one flexible mounting portion attached to an end of the sound-generating portion and extending the sound-generating portion;

wherein, for connecting the string to the musical instrument, a portion of the string is in contact with fastening means of the musical instrument, wherein, in a mounted state of the string, the mounting portion extends over the portion of the string being in contact with the fastening means and further, extends over a portion of the string extending between the fastening means, and wherein the sound-generating portion and the mounting portion are of different materials, wherein the mounting portion constitutes a portion of a length of a free portion of the string adapted to be mounted between a tuning mechanism and a string holder of the musical instrument.

11. A string for a musical instrument comprising:

a sound-generating portion:

at least one flexible mounting portion attached to an end of the sound-generating portion and extending the sound-generating portion;

wherein, for connecting the string to the musical instrument, a portion of the string is in contact with fastening means of the musical instrument, wherein, in a mounted state of the string, the mounting portion extends over the portion of the string being in contact with the fastening means and further, extends over a portion of the string extending between the fastening means, and wherein the sound-generating portion and the mounting portion are of different materials, wherein the core extends exclusively along the sound-generating portion.

12. A string for a musical instrument comprising:

a sound-generating portion:

at least one flexible mounting portion attached to an end of the sound-generating portion and extending the sound-generating portion;

wherein, for connecting the string to the musical instrument, a portion of the string is in contact with fastening means of the musical instrument, wherein, in a mounted state of the string, the mounting portion extends over the portion of the string being in contact with the fastening means and further, extends over a portion of the string extending between the fastening means, and wherein the sound-generating portion and the mounting portion are of different materials, wherein the mounting portion is adapted to extend around a peg of the musical instrument.

* * * * *